US012451043B2

(12) United States Patent
Wang et al.

(10) Patent No.: US 12,451,043 B2
(45) Date of Patent: Oct. 21, 2025

(54) METHOD, APPARATUS, AND DEVICE FOR DRIVING DISPLAY SCREEN TO DISPLAY

(71) Applicant: Yungu (Gu'an) Technology Co., Ltd., Hebei (CN)

(72) Inventors: Tiegang Wang, Langfang (CN); Xiaobao Zhang, Langfang (CN); Haibin Jiang, Langfang (CN); Xiuning Shangguan, Langfang (CN); Guangguang Han, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 200 days.

(21) Appl. No.: 18/390,110

(22) Filed: Dec. 20, 2023

(65) Prior Publication Data

US 2024/0127733 A1 Apr. 18, 2024

Related U.S. Application Data

(63) Continuation of application No. PCT/CN2023/090893, filed on Apr. 26, 2023.

(30) Foreign Application Priority Data

Jun. 8, 2022 (CN) ......................... 202210642636.0

(51) Int. Cl.
*G09G 3/20* (2006.01)

(52) U.S. Cl.
CPC ... *G09G 3/2074* (2013.01); *G09G 2320/0204* (2013.01); *G09G 2320/0242* (2013.01)

(58) Field of Classification Search
CPC ... G09G 2320/0204; G09G 2320/0242; G09G 2320/0271; G09G 2320/0626; G09G 2354/00; G09G 3/2074; G09G 5/10
See application file for complete search history.

(56) References Cited

U.S. PATENT DOCUMENTS

| | | | | |
|---|---|---|---|---|
| 2019/0340981 | A1* | 11/2019 | Pyo | G09G 3/3291 |
| 2020/0410918 | A1 | 12/2020 | Gai et al. | |
| 2023/0260466 | A1* | 8/2023 | Jiang | G09G 5/10 345/204 |

FOREIGN PATENT DOCUMENTS

| | | | |
|---|---|---|---|
| CN | 1870097 | A | 11/2006 |
| CN | 103985356 | A | 8/2014 |

(Continued)

OTHER PUBLICATIONS

International Search Report issued on Jun. 16, 2023, in corresponding International Application No. PCT/CN2023/090893, 7 pages.

(Continued)

*Primary Examiner* — Robin J Mishler
(74) *Attorney, Agent, or Firm* — Maier & Maier, PLLC

(57) ABSTRACT

A method, apparatus, device, and storage medium for driving a display screen to display. The method includes: obtaining a current level of brightness adjustment of the display screen; obtaining, under a condition that the current level satisfies a first preset condition, an initial data voltage value and a compensation data voltage value corresponding to the current level, in which the first preset condition includes that a power voltage value corresponding to the current level is different from a power voltage value corresponding to a previous level or a next level directly adjacent to the current level, the current level is a level other than a designated level; and driving the display screen to display based on the initial data voltage value and the compensation data voltage value.

20 Claims, 5 Drawing Sheets

(56) References Cited

FOREIGN PATENT DOCUMENTS

| | | | |
|---|---|---|---|
| CN | 104318902 | A | 1/2015 |
| CN | 107103883 | A | 8/2017 |
| CN | 108986053 | A | 12/2018 |
| CN | 109166521 | A | 1/2019 |
| CN | 110060653 | A | 7/2019 |
| CN | 110473502 | A | 11/2019 |
| CN | 110634437 | A | 12/2019 |
| CN | 110890056 | A | 3/2020 |
| CN | 111599296 | A | 8/2020 |
| CN | 111883063 | A | 11/2020 |
| CN | 112950657 | A | 6/2021 |
| CN | 113178162 | A | 7/2021 |
| CN | 113228152 | A | 8/2021 |
| CN | 113450693 | A | 9/2021 |
| CN | 114283732 | A | 4/2022 |
| CN | 114387920 | A | 4/2022 |
| CN | 115188326 | A | 10/2022 |
| JP | 2011017816 | A | 1/2011 |
| KR | 1020190048806 | A | 5/2019 |
| WO | 2020232588 | A1 | 11/2020 |

OTHER PUBLICATIONS

Office Action issued on Mar. 14, 2025, in corresponding Chinese Application No. 202210642636.0, 12 pages.
Office Action issued on Jul. 14, 2025, in corresponding Korean Application No. 10-2023-7043612, 19 pages.
Extended Search Report issued on Jun. 5, 2025, in corresponding European Application No. 23817288.6, 17 pages.
Office Action issued on Aug. 18, 2025, in corresponding Chinese Application No. 202210642636.0, 8 pages.

* cited by examiner

METHOD, APPARATUS, AND DEVICE FOR DRIVING DISPLAY SCREEN TO DISPLAY

CROSS REFERENCE TO RELATED APPLICATION

The present application is a continuation of International Application No. PCT/CN2023/090893, filed on Apr. 26, 2023, which claims priority to Chinese Patent Application No. 202210642636.0 filed on Jun. 8, 2022, both of which are incorporated herein by reference in their entireties.

TECHNICAL FIELD

The present application relates to the field of display technology, and particularly to a method, apparatus, device, and storage medium for driving a display screen to display.

BACKGROUND

With the continuous development of display technology, the function of the display screen is more and more diversified. For example, the display screen may be provided with a brightness adjustment control, which can adjust the brightness of the display screen by adjusting the level of brightness adjustment. Taking a brightness adjustment bar as the brightness adjustment control, and for example, the brightness adjustment bar is slid to present the same screen with different brightness.

When the brightness of the display screen is adjusted, the brightness variation of the display screen should be uniform to adapt to human eye. Nonetheless, the brightness variation of the display screen is not uniform in the related technology.

SUMMARY

Embodiments of the present application provide a method, apparatus, device, and storage medium for driving a display screen to display, which can solve the problem that the brightness variation of the display screen is not uniform in the related technology.

In a first aspect, the embodiments of the present application provide a method for driving a display screen to display, including: obtaining a current level of brightness adjustment of the display screen; obtaining, under a condition that the current level satisfies a first preset condition, an initial data voltage value and a compensation data voltage value corresponding to the current level, in which the first preset condition includes that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different; and driving the display screen to display based on the initial data voltage value and the compensation data voltage value.

In a second aspect, the embodiments of the present application provide an apparatus for driving a display screen to display, including: a first data obtaining module configured to obtain a current level of brightness adjustment of the display screen; a second data obtaining module configured to obtain, under a condition that the current level satisfies a first preset condition, an initial data voltage value and a compensation data voltage value corresponding to the current level, in which the first preset condition includes that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different; and a display driving module configured to drive the display screen to display based on the initial data voltage value and the compensation data voltage value.

In a third aspect, the embodiments of the present application provide a terminal device, including: a processor and a memory storing computer program instructions, in which the processor implements, when executing the computer program instructions, the method for driving a display screen to display of any one of the embodiments of the first aspect.

In a fourth aspect, the embodiments of the present application provide a computer-readable storage medium storing a computer program thereon, in which the computer program implements, when executed by a processor, the method for driving a display screen to display of any one of the embodiments of the first aspect.

In the method, apparatus, device, and storage medium for driving a display screen to display according to the embodiments of the present application, under a condition that the power voltage value corresponding to the current level is different from the power voltage value corresponding to the level directly adjacent to the current level, and the current level is a level other than the designated level, that is, under a condition that the current level is a level corresponding to an abrupt change of the power voltage value, the display screen is no longer driven to display based on only the initial data voltage value corresponding to the current level, the compensation data voltage value corresponding to the current level is also obtained, and the display screen is driven to display based on the initial data voltage value and the compensation data voltage value corresponding to the current level. Since the current level with the abrupt change of the power voltage value is compensated by the compensation data voltage value, it can be avoided that a brightness ratio of the display screen at the current level is suddenly negative, which cause brightness distortion in the display screen, and thus the non-uniform brightness variation of the display screen due to the abrupt change of the power voltage value can be avoided.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features, and the accompanying drawings are not drawn to actual scale.

DETAILED DESCRIPTION

Figure 1:
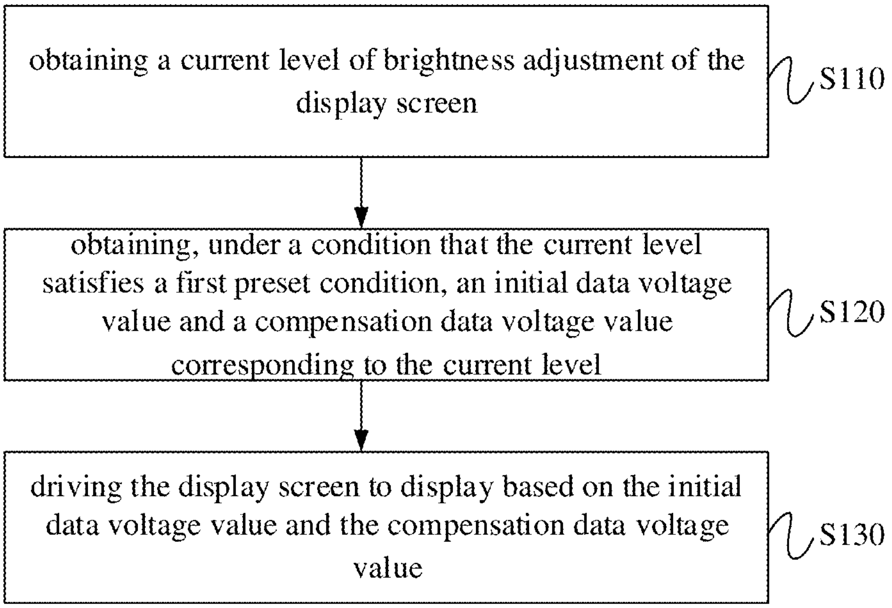
FIG. 1 shows a flowchart of a method for driving a display screen to display according to an embodiment of the present application.

Features and exemplary embodiments of various aspects of the present application will be described in detail below. In order to make the objects, technical solutions and advantages of the present application clearer, the present application is further described in detail below with reference to the accompanying drawings and specific embodiments. It should be understood that the specific embodiments described herein are only configured to explain the present application, but not to limit the present application. For those skilled in the art, the present application can be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be understood that the term "and/or" used in the present application represents only a kind of association relationship that describes the associated objects, and indicates that there may be three kinds of relationships. For example, A and/or B may indicate: A alone, both A and B, and B alone. In addition, the character "/" in the present application generally indicates an "or" relationship for the associated objects.

Various modifications and variations can be made in the present application without departing from the gist or scope of the present application, which is apparent to those skilled in the art. Thus, the present application is intended to contemplate the modifications and variations of the present application that fall within the scope of the corresponding claims (the technical solutions claimed to be protected) and their equivalents. It should be noted that the implementations according to the embodiments of the present application can be combined with each other without contradiction.

Before the technical solutions according to the embodiments of the present application are described, the problems in the related technology are first specified to facilitate the understanding of the embodiments of the present application.

The display screen may be provided with a brightness adjustment control, which can adjust the brightness of the display screen by adjusting the level of brightness adjustment. Under the same gray scale, the target display brightness corresponding to different levels are different, and for example, the target display brightness corresponding to a high level is greater than the target display brightness corresponding to a low level. In addition, since the brightness requirements for the different levels are different, in order to reduce the power consumption of the display screen, at least a portion of the different levels may correspond to different power voltage values. The power voltage values include a low level power voltage (ELVSS) value, and the low level power voltage terminal may be electrically connected to the cathode of the light-emitting element of the display screen, so that the low level power voltage (ELVSS) value can be provided to the cathode of the light-emitting element.

In order to more adapt to human eye, the brightness variation of the display screen should be uniform. For example, if the brightness ratio ($D_L/L$) is greater than 0 and less than a preset value, it may be considered that the brightness variation is uniform; and the preset value may be pre-determined, e.g., in accordance with the manufacturer's characteristic requirements. Herein, the brightness ratio $$\frac{D_L}{L} = \frac{L_i - L_{i-1}}{L_{i-1}},$$

where $L_i$ and $L_{i-1}$ represent the display brightness of the display screen at two adjacent levels, respectively, $L_i$ is the display brightness of the display screen at the previous one of the adjacent levels, and $L_{i-1}$ is the display brightness of the display screen at the next one of the adjacent levels.

Nonetheless, the inventor has found that since a portion of the different levels may correspond to different power voltage values, that is, the power voltage value corresponding to some level is subject to an abrupt change relative to the power voltage value corresponding to a level which is adjacent to this level, and the power voltage value also affects the brightness of the display screen, therefore the display brightness corresponding to the level with the abrupt change of the power voltage value is also subject to an abrupt change, and in turn the brightness ratio $D_L/L$ corresponding to the level with the abrupt change is less than 0. That is, the brightness ratio corresponding to this level is negative, which is embodied as brightness reversal of the display screen at this level, resulting in that the brightness variation of the display screen is not uniform, and the user experience is affected.

In view of the above finding of the inventor, the embodiments of the present application provide a method, apparatus, device, and storage medium for driving a display screen to display, which can solve the problem that the brightness variation of the display screen is not uniform.

A method for driving a display screen to display according to the embodiments of the present application will be first described below.

As shown in FIG. 1, the method for driving a display screen to display according to the embodiments of the present application includes steps S110 to S130.

S110: obtaining a current level of brightness adjustment of the display screen.

S120: obtaining, under a condition that the current level satisfies a first preset condition, an initial data voltage value and a compensation data voltage value corresponding to the current level, in which the first preset condition includes that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different.

S130: driving the display screen to display based on the initial data voltage value and the compensation data voltage value.

Exemplarily, in order to ensure good display quality for the display screen, a gamma tuning may be performed for the display screen. Nonetheless, the brightness adjustment of the display screen may include a plurality of levels, and if the gamma tuning is performed at each level, the time for the gamma tuning will be long. In order to avoid that the time for the gamma tuning is too long, some of the plurality of levels may selected as the designated levels and the gamma tuning is performed only at the designated levels, so as to determine the corresponding data voltage values of the display screen at the designated levels. The initial data voltage value corresponding to a level other than the designated level may be determined according to the data voltage value corresponding to the designated level, so that the gamma tuning needs not to be performed for the display screen at the level other than the designated level, therefore the data for the gamma tuning is compressed, the time for the gamma tuning is reduced, and the manufacturing efficiency is improved.

In the present application, in order to distinguish between the designated level and a level other than the designated level, the data voltage value corresponding to the level other than the designated level is referred to as the initial data voltage value.

Figure 2:
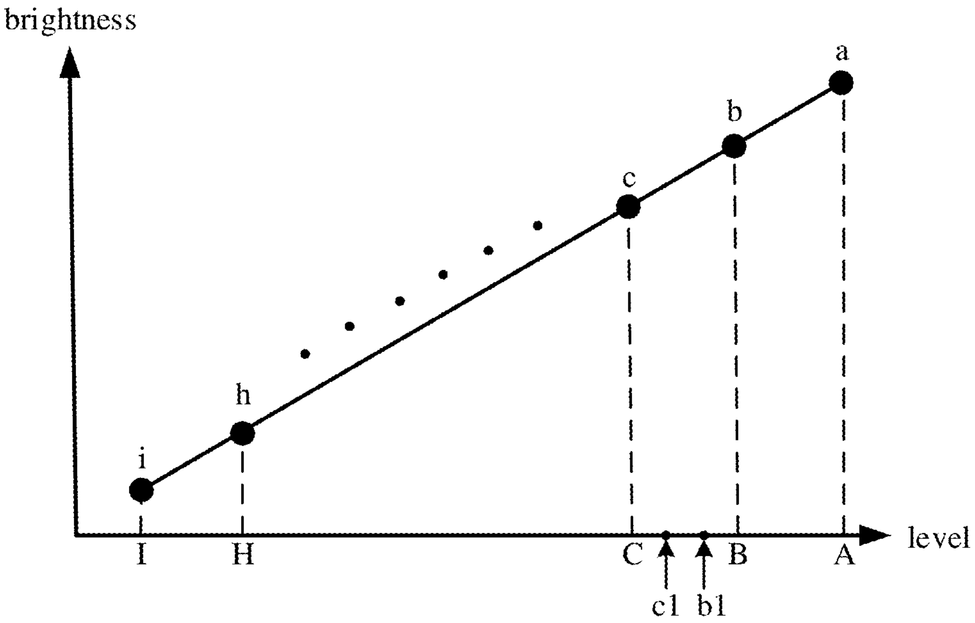
FIG. 2 shows a schematic diagram of a brightness adjustment in a method for driving a display screen to display according to an embodiment of the present application.

For example, as shown in FIG. 2, nine of the plurality of levels may be selected as the designated levels, i.e., designated level A to designated level I, respectively. In FIG. 2, the horizontal axis denotes the level, and the vertical axis denotes the brightness. Specifically, the horizontal axis may denote a register value, which may include 0 to 4095 from small to large, corresponding to the level. The designated level A may be the highest level, and the designated level I may be the lowest level. For example, the brightness corresponding to the designated level A under the maximum gray scale value may be 700 nit, and the brightness corresponding to the designated level I under the maximum gray scale value may be 2 nit.

Exemplarily, the power voltage value corresponding to each designated level may be pre-set. For example, the power voltage values corresponding to the designated level A to the designated level I may be a to i, respectively, and the power voltage value corresponding to the level other than the designated level may be determined according to the power voltage value corresponding to the designated level. The power voltage values corresponding to different designated levels may be different.

For example, the power voltage value corresponding to the designated level B is −2.0 V, the power voltage value corresponding to the designated level C is −2.3 V, a level b1 and a level c1 are between the designated level B and the designated level C, and the power voltage values corresponding to the level b1 and the level c1 may be between −2.0 V and −2.3 V. For example, the power voltage value corresponding to the level b1 may be −2.1 V, and the power voltage value corresponding to the level c1 may be −2.2 V. Exemplarily, the initial data voltage values corresponding to the level b1 and the level c1 may be determined according to the data voltage values corresponding to the designated level B and the designated level C.

Figure 3:
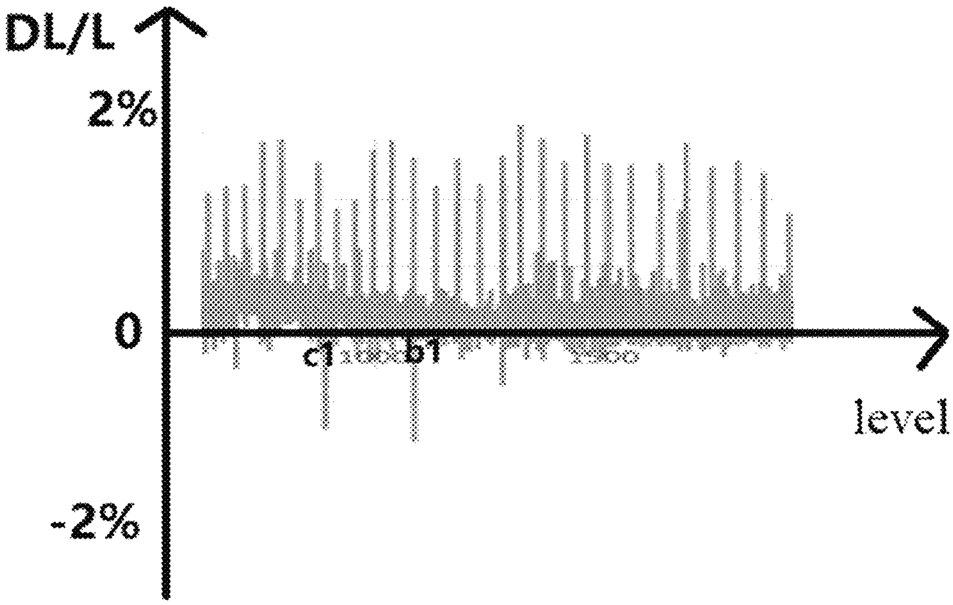
FIG. 3 shows a schematic diagram of a brightness ratio in a method for driving a display screen to display according to an embodiment of the present application.

For example, the power voltage value corresponding to the level b1 and the level c1 is different from the power voltage value corresponding to the level directly adjacent to the level b1 and the level c1, under a condition that the brightness of the display screen is adjusted to the level b1 or the level c1, if the display screen is driven to display based on only the initial data voltage value corresponding to the level b1 and the level c1, since the level b1 and the level c1 are subject to an abrupt change of the power voltage value relative to the level directly adjacent to the level b1 and the level c1, as shown in FIG. 3, the brightness ratio $$\frac{D_L}{L}$$

of the display screen at the level b1 and the level c1 is negative, resulting in that the brightness variation of the display screen is not uniform. In FIG. 3, the horizontal axis denotes the level, and the vertical axis denotes the brightness ratio $$\frac{D_L}{L}.$$

Specifically, the horizontal axis may denote a register value corresponding to the level.

Exemplarily, the previous level or the next level directly adjacent to the current level may be the designated level or a level other than the designated level. In the method for driving a display screen to display according to the embodiments of the present application, under a condition that the power voltage value corresponding to the current level is different from the power voltage value corresponding to the level directly adjacent to the current level, and the current level is a level other than the designated level, that is, under a condition that the current level is a level corresponding to an abrupt change of the power voltage value, the display screen is no longer driven to display based on only the initial data voltage value corresponding to the current level, the compensation data voltage value corresponding to the current level is also obtained, and the display screen is driven to display based on the initial data voltage value and the compensation data voltage value corresponding to the current level. Since the current level with the abrupt change of the power voltage value is compensated by the compensation data voltage value, it can be avoided that the brightness ratio $$\frac{D_L}{L}$$

of the display screen at the current level is negative, and thus the non-uniform brightness variation of the display screen due to the abrupt change of the power voltage value can be avoided.

In some optional embodiments, the method for driving a display screen to display according to the embodiments of the present application may further include: driving, under a condition that the current level does not satisfy the first preset condition, the display screen to display based on the initial data voltage value corresponding to the current level.

For example, if the current level is the designated level or if the current level is a level other than the designated level, but the power voltage value corresponding to the current level is the same as the power voltage value corresponding to the level directly adjacent to the current level, it may be considered that the power voltage value corresponding to the current level is not subject to an abrupt change, and the brightness corresponding to the current level will not be reversed, and in such a case, the initial data voltage value corresponding to the current level needs not to be compensated.

Figure 4:
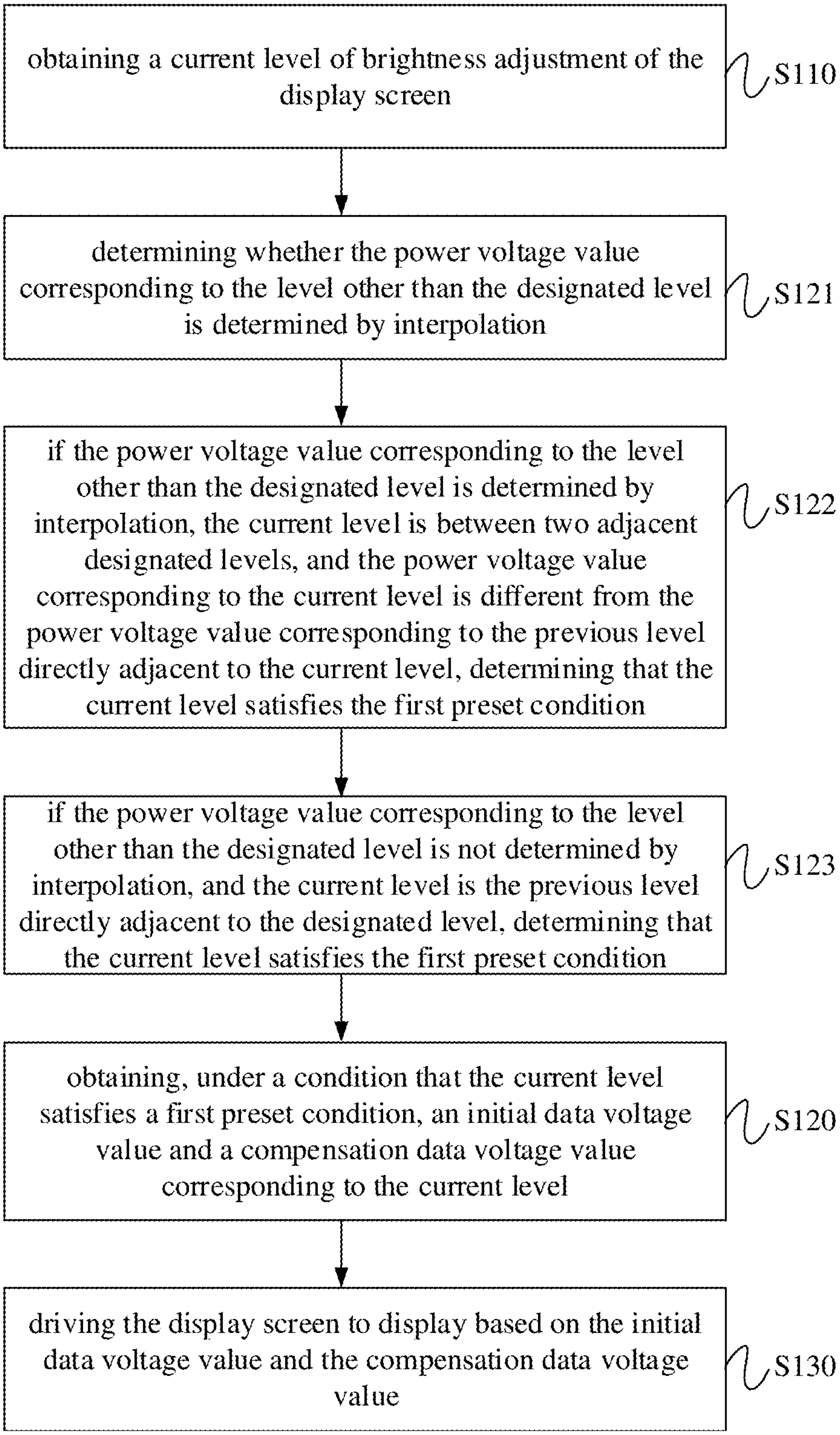
FIG. 4 shows a flowchart of a method for driving a display screen to display according to another embodiment of the present application.

In some optional embodiments, it may be first determined whether the current level satisfies the first preset condition. As shown in FIG. 4, the method for driving a display screen to display according to the embodiments of the present application may further include steps S121 to S123.

S121: determining whether the power voltage value corresponding to the level other than the designated level is determined by interpolation.

S122: if the power voltage value corresponding to the level other than the designated level is determined by interpolation, the current level is between two adjacent designated levels, and the power voltage value corresponding to the current level is different from the power voltage value corresponding to the previous level directly adjacent to the current level, determining that the current level satisfies the first preset condition.

S123: if the power voltage value corresponding to the level other than the designated level is not determined by interpolation, and the current level is a previous level directly adjacent to the designated level, determining that the current level satisfies the first preset condition.

As described above, the power voltage value corresponding to each designated level may be pre-set, and the power voltage value corresponding to the level other than the designated level may be determined according to the power voltage value corresponding to the designated level.

For example, the power voltage value corresponding to the level other than the designated level may be determined by interpolation according to the power voltage value corresponding to the designated level. Specifically, the interpolation may include linear interpolation. Still taking the designated level B and the designated level C in FIG. 3 as an example, the power voltage value corresponding to the designated level B is −2.0V, the power voltage value corresponding to the designated level C is −2.3V, and the level b1 and the level c1 are between the designated level B and the designated level C, it may be obtained by linear interpolation that the power voltage value corresponding to the level b1 may be −2.1 V, and the power voltage value corresponding to the level c1 may be −2.2 V.

For another example, still taking FIG. 3 as an example, a plurality of levels may be between every adjacent two designated levels, and for ease of understanding, the register value corresponding to the designated level B is 100, the register value corresponding to the designated level C is 70, and a plurality of levels, which are respectively corresponding to the register values 71 to 99, may be between the designated level B and the designated level C. Herein, the power voltage value corresponding to the designated level B is labeled as $V_B$, the power voltage value corresponding to the designated level C is labeled as $V_C$, and for example, every six levels share one power voltage value, and the power voltage value corresponding to the next level adjacent to the designated level is the same as the power voltage value corresponding to the designated level. For example, the power voltage value corresponding to the register values 95 to 100 may be $V_B$, the power voltage value corresponding to the register values 89 to 94 may be $V_2$, the power voltage value corresponding to the register values 83 to 88 may be $V_3$, the power voltage value corresponding to the register values 77 to 82 may be $V_4$, the power voltage value corresponding to the register values 71 to 76 may be $V_5$, and the power voltage value corresponding to the register values 65 to 70 may be $V_C$, in which the power voltage values $V_2$, $V_3$, $V_4$, and $V_5$ are determined by linear interpolation according to the power voltage values $V_B$ and $V_C$. Taking the level corresponding to the register value 89 as an example, the register value corresponding to the previous level directly adjacent to this level is 90, while the power voltage values corresponding to the register values 89 and 90 are both $V_2$, therefore it may be considered that the levels corresponding to the register values 71, 77, 83, 89, and 95 are not subject to an abrupt change of the power voltage value. Moreover, it may be considered that the levels corresponding to the register values 76, 82, 88, and 94 are subject to an abrupt change of the power voltage value, and if the register value of the current level is any one of 76, 82, 88, and 94, it may be determined that the current level satisfies the first preset condition.

For example, the power voltage value corresponding to the level other than the designated level may be determined according to the power voltage value corresponding to the designated level, but not by interpolation. Specifically, still taking FIG. 2 as an example, one or more levels may be between every adjacent two designated levels, and for ease of understanding, the register value corresponding to the designated level B is 100, the register value corresponding to the designated level C is 70, and a plurality of levels, which are respectively corresponding to the register values 71 to 99, may be between the designated level B and the designated level C. For example, the power voltage values corresponding to the plurality of levels with the register values 71 to 99 are the same as the power voltage value corresponding to the designated level B, i.e., $V_B$, and the power voltage value corresponding to the designated level C is $V_C$. Therefore, although the power voltage value corresponding to the designated level C is different from the power voltage value corresponding to the previous level (i.e., the level corresponding to the register value 71) directly adjacent to the designated level C, since the gamma tuning is actually performed at the designated level, the inventor has found that the brightness ratio $$\frac{D_L}{L}$$

at the previous level (i.e., the level corresponding to the register value 71) directly adjacent to the designated level is negative. Therefore, under a condition that the power voltage value corresponding to the level other than the designated level is not determined by interpolation, if the current level is the previous level directly adjacent to the designated level, it is determined that the current level satisfies the first preset condition.

According to embodiments of the present application, the manner for determining the power voltage value corresponding to the level other than the designated level is first determined, and then it is determined whether the current level satisfies the first preset condition by using different conditions for different manners, the accuracy of the determination can be ensured. Exemplarily, the brightness of the display screen may be adjusted in advance, for example, by successively changing the levels of the display screen from bright to dark, and the levels of which the brightness ratio $$\frac{D_L}{L}$$

is negative are determined, in which the level of which the brightness ratio $$\frac{D_L}{L}$$

is negative and has a small absolute value is neglected, and the other levels of which the brightness ratio $$\frac{D_L}{L}$$

is negative, which are not neglected, are recorded as target levels. It may be determined whether the current level belongs to the target levels, and if yes, it may be considered that the current level satisfies the first preset condition.

In some optional embodiments, at the current level, the compensation data voltage values corresponding to different gray scale values may be the same. For example, the bit number of the gray scale is 8 bits, and at the current level, the compensation data voltage values corresponding to the gray scales from 0 to 255 may be the same. Since different gray scale values share the same compensation data voltage value at the current level, the amount of data to be stored and the cost can be reduced; moreover, the determination of the compensation data voltage value shared by different gray scale values may be based on only a certain gray scale value, for example, the test screen may be a screen at a certain gray scale value, and thus the display screen needs not to display screens corresponding to different gray scale values, the tuning time required for determining the compensation data voltage value can be shortened.

As an optional embodiment, the compensation data voltage value corresponding to any one of the gray scale values at the current level is the same as the compensation data voltage value corresponding to a maximum gray scale value of the display screen at the current level. The gray scale value is positively correlated with the brightness, the greater the gray scale value, the greater the brightness, and thus the more obvious the corresponding negative brightness ratio. If the compensation data voltage value corresponding to the maximum gray scale value at the current level can solve the negative brightness ratio corresponding to the maximum gray scale value, theoretically, this compensation data voltage value can also solve the negative brightness ratio corresponding to other gray scale values.

Exemplarily, the maximum gray scale value may include gray scale 255.

Exemplarily, the compensation data voltage value corresponding to the current level may be determined based on only the maximum gray scale value of the display screen.

It may be understood that the memory corresponding to the display screen may only store the compensation data voltage value corresponding to the maximum gray scale value at the current level.

In some optional embodiments, in order to improve the compensation accuracy, the gray scale range of the display screen may be divided into a plurality of gray scale intervals, and at the current level, the compensation data voltage values corresponding to different gray scale values within a same gray scale interval are the same, and the compensation data voltage values corresponding to different gray scale intervals may be different. It may be understood that the memory corresponding to the display screen may store the compensation data voltage values corresponding to the various gray scale intervals at the current level.

Similarly, if the compensation data voltage value corresponding to the maximum gray scale value at the current level can solve the negative brightness ratio corresponding to the maximum gray scale value, the compensation data voltage value corresponding to any one of the gray scale intervals at the current level may be the same as the compensation data voltage value corresponding to a maximum gray scale value within this gray scale interval at the current level. Exemplarily, the compensation data voltage value corresponding to the current level may be determined based on only the maximum gray scale value within this gray scale interval. It may be understood that the memory corresponding to the display screen may only store the compensation data voltage value corresponding to the maximum gray scale value within each gray scale interval at the current level.

As described above, the gamma tuning may be performed for the display screen only at the designated level, the data voltage value corresponding to the display screen at the designated level is determined, and the initial data voltage value corresponding to the level other than the designated level may be determined according to the data voltage value corresponding to the designated level, thereby reducing the time for the gamma tuning.

In some optional embodiments, the initial data voltage value may be determined by linear interpolation according to the data voltage values corresponding to at least two designated levels. In this manner, since the data voltage value corresponding to the designated level is obtained according to the actual gamma tuning, even if no gamma tuning is performed for the display screen at the level other than the designated level, it can still be ensured that the initial data voltage value corresponding to the other level is accurate; moreover, only the data voltage value corresponding to the designated level is stored, the amount of data to be stored can be greatly reduced, and the capacity of the memory corresponding to the display screen can be reduced. The capacity of the memory is generally positively correlated with the area, that is, the area of the memory can be reduced, and the cost is reduced.

Exemplarily, under a condition that the current level satisfies the first preset condition, the designated levels may include a first designated level and a second designated level, the current level is between the first designated level and the second designated level, the data voltage values corresponding to the current level, the first designated level and the second designated level may be considered to conform to a linear relationship, and thus the initial data voltage value corresponding to the current level may be determined by linear interpolation according to the data voltage values respectively corresponding to the first designated level and the second designated level.

Since the display situations of adjacent levels are relatively close, the data voltage values corresponding to the adjacent levels may be considered to conform to a linear relationship. Exemplarily, the initial data voltage value corresponding to the other level may be determined by linear interpolation according to the data voltage values corresponding to two designated levels directly adjacent to the other level.

Exemplarily, under a condition that the current level satisfies the first preset condition, the current level is between the first designated level and the second designated level, the first designated level and the second designated level may be directly adjacent, and the initial data voltage value according to the current level may be determined according to the following equation (1):

$$\frac{V_1 - V_2}{DBV_1 - DBV_2} = \frac{V_1 - V_0}{DBV_1 - DBV_0} \quad (1)$$

where $V_1$ is a data voltage value corresponding to the first designated level, $V_2$ is a data voltage value corresponding to the second designated level, $V_0$ is the initial data voltage value according to the current level, $DBV_1$ is a register value corresponding to the first designated level, $DBV_2$ is a register value corresponding to the second designated level, and $DBV_0$ is a register value corresponding to the current level.

For example, as shown in FIG. 3, if the current level is the level b1, the designated level B may be the first designated level, and the designated level C may be the second designated level.

Exemplarily, a 51 register may be used to indicate the level of brightness adjustment. The register value corresponding to the level may be stored in the form of hexadecimal, which may be converted to decimal when the initial data voltage value corresponding to the current level is calculated.

Exemplarily, the display screen may display a certain range of gray scales, and at the same level, the data voltage values corresponding to different gray scale values are different. In the above equation (1), $V_1$, $V_2$, and $V_0$ denote the data voltage values under the same gray scale value. For example, taking gray scale 255 as an example, $V_1$ is the data voltage value corresponding to gray scale 255 at the first designated level, $V_2$ is the data voltage value corresponding to gray scale 255 at the second designated level, and $V_0$ is the initial data voltage value according to gray scale 255 at the current level.

For example, if the current level is the level b1 and the compensation data voltage value corresponding to the current level is offset, then in S130, the display screen may be driven to display based on the sum of the initial data voltage value $V_0$ corresponding to the current level and the compensation data voltage value offset.

Exemplarily, when the gamma tuning is performed for the display screen at any designated level, some gray scale binding points may be selected from a range of gray scales, and the gamma tuning is performed for the display screen only at the gray scale binding points to obtain the data voltage values corresponding to the various gray scale binding points. The data voltage value corresponding to a gray scale value other than the gray scale binding points may be calculated by linear interpolation according to the data voltage values corresponding to the gray scale binding points.

Exemplarily, the gray scale binding points corresponding to different designated levels may be the same.

Figure 5:
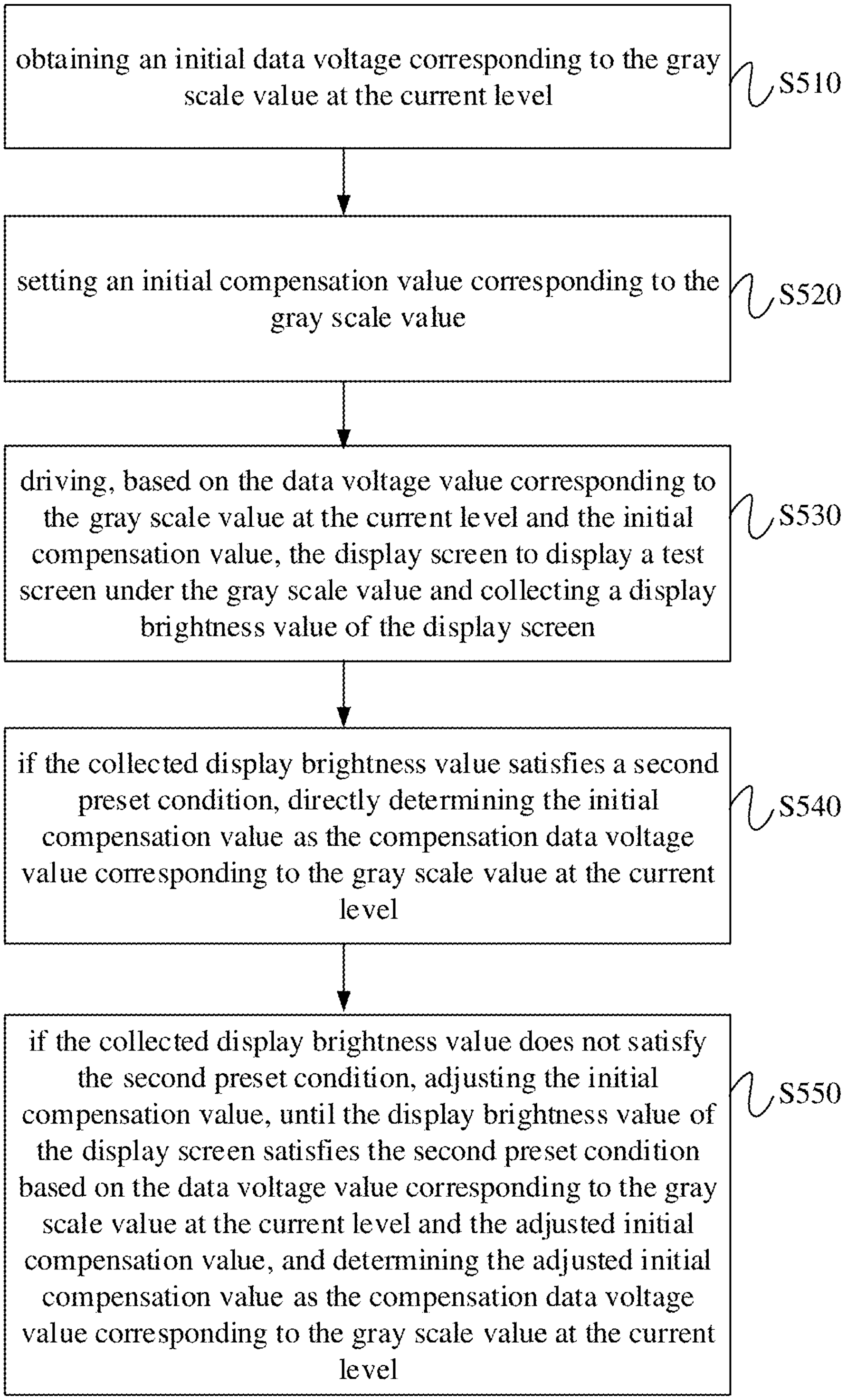
FIG. 5 shows a flowchart of a process for determining a compensation data voltage value in a method for driving a display screen to display according to an embodiment of the present application.

In some optional embodiments, under a condition that the current level satisfies the first preset condition, as shown in FIG. 5, the compensation data voltage value corresponding to at least one gray scale value at the current level may be determined by steps S510 to S550.

S510: obtaining an initial data voltage value corresponding to the gray scale value at the current level.

S520: setting an initial compensation value corresponding to the gray scale value.

S530: driving, based on a data voltage value corresponding to the gray scale value at the current level and the initial compensation value, the display screen to display a test screen under the gray scale value and collecting a display brightness value of the display screen.

S540: if the collected display brightness value satisfies a second preset condition, directly determining the initial compensation value as the compensation data voltage value corresponding to the gray scale value at the current level.

S550: if the collected display brightness value does not satisfy the second preset condition, adjusting the initial compensation value, until the display brightness value of the display screen satisfies the second preset condition based on the data voltage value corresponding to the gray scale value at the current level and the adjusted initial compensation value, and determining the adjusted initial compensation value as the compensation data voltage value corresponding to the gray scale value at the current level.

The second preset condition includes $$0 < \frac{L_{(n+1)} - L_n}{L_n} \leq 2\%,$$

where $L_n$ is the collected display brightness value at the current level, and $L_{(n+1)}$ is the display brightness value of the display screen at a previous level directly adjacent to the current level.

In S510, taking gray scale 255 as an example, as shown in FIG. 3, for example, the current level is the level b1, the designated level B and the designated level C are directly adjacent to the level b1, the data voltage value corresponding to gray scale 255 at the designated level B may replace $V_1$ in the above equation (1), the data voltage value corresponding to gray scale 255 at the designated level C may replace $V_2$ in the above equation (1), the register value corresponding to the designated level B may replace $DBV_1$ in the above equation (1), the register value corresponding to the designated level C may replace $DBV_2$ in the above equation (1), and the register value corresponding to the level b1 may replace $DBV_0$ in the above equation (1), then the initial data voltage value $V_0$ corresponding to the level b1 may be calculated.

In S520, the initial compensation value may be set empirically.

In S530, the display screen may be lighted up based on the sum of the data voltage value corresponding to the gray scale value at the current level and the initial compensation value, so as to display the test screen under the gray scale value.

Exemplarily, the display screen may include sub-pixels of a plurality of colors, and step S520 may specifically include: setting the initial compensation values respectively corresponding to the sub-pixels of each color under the gray scale value. Accordingly, the test screen under the gray scale value may include a white screen under the gray scale value. Compared with a tuning using a monochrome screen under the gray scale value, the number for lighting up the display screen can be reduced.

It may be understood that according to the preset condition, the display brightness value corresponding to the gray scale value at the previous level directly adjacent to the current level needs to be obtained. For example, if the current level is the level b1 and the designated level B is the previous level directly adjacent to the level b1, the display brightness value corresponding to the gray scale value at the designated level B is obtained.

In the manner for determining the compensation data voltage value according to the embodiments of the present application, since the display screen is actually tuned, the accuracy of the resulting compensation data voltage value can be ensured.

The display screen in the embodiments of the present application may be an Organic Light Emitting Diode (OLED) display screen.

Figure 6:
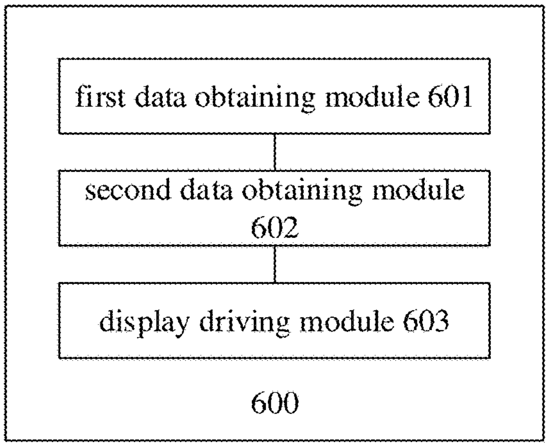
FIG. 6 shows a schematic structural diagram of an apparatus for driving a display screen to display according to an embodiment of the present application.

The embodiments of the present application further provide an apparatus for driving a display screen to display. As shown in FIG. 6, the apparatus 600 for driving a display screen to display according to the embodiments of the present application may include a first data obtaining module 601, a second data obtaining module 602, and a display driving module 603.

The first data obtaining module 601 is configured to obtain a current level of brightness adjustment of the display screen.

The second data obtaining module 602 is configured to obtain, under a condition that the current level satisfies a first preset condition, an initial data voltage value and a compensation data voltage value corresponding to the current level, in which the first preset condition includes that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different.

The display driving module 603 is configured to drive the display screen to display based on the initial data voltage value and the compensation data voltage value.

In the apparatus for driving a display screen to display according to the embodiments of the present application, under a condition that the power voltage value corresponding to the current level is different from the power voltage value corresponding to the level directly adjacent to the current level, and the current level is a level other than the designated level, that is, under a condition that the current level is a level corresponding to an abrupt change of the power voltage value, the display screen is no longer driven to display based on only the initial data voltage value corresponding to the current level, the compensation data voltage value corresponding to the current level is also obtained, and the display screen is driven to display based on the initial data voltage value and the compensation data voltage value corresponding to the current level. Since the current level with the abrupt change of the power voltage value is compensated by the compensation data voltage value, it can be avoided that the brightness ratio $D_L/L$ of the display screen at the current level is negative, and thus the non-uniform brightness variation of the display screen due to the abrupt change of the power voltage value can be avoided.

In some optional embodiments, at the current level, the compensation data voltage values corresponding to different gray scale values are the same.

Optionally, the compensation data voltage value corresponding to any gray scale value at the current level is the same as the compensation data voltage value corresponding to a maximum gray scale value of the display screen at the current level.

In some optional embodiments, the display screen includes a plurality of gray scale intervals, and at the current level, the compensation data voltage values corresponding to different gray scale values within a same gray scale interval are the same.

Optionally, the compensation data voltage value corresponding to any one of the gray scale intervals at the current level is the same as the compensation data voltage value corresponding to a maximum gray scale value within the gray scale interval at the current level.

Figure 7:
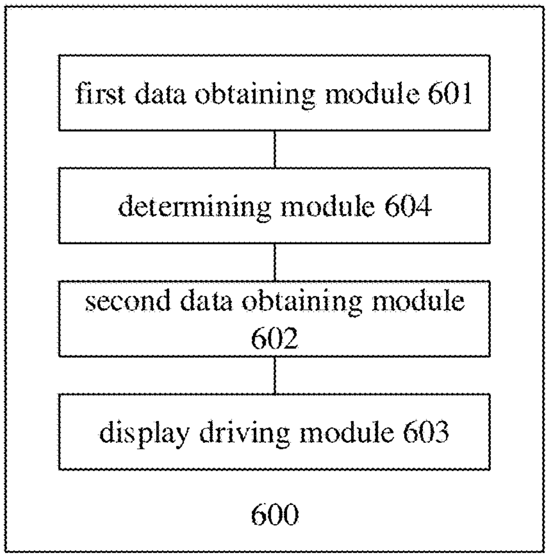
FIG. 7 shows a schematic structural diagram of an apparatus for driving a display screen to display according to another embodiment of the present application.

In some optional embodiments, as shown in FIG. 7, the apparatus 600 for driving a display screen to display according to the embodiments of the present application may further include a determining module 604, which is configured to: determine whether the power voltage value corresponding to the level other than the designated level is determined by interpolation; if the power voltage value corresponding to the level other than the designated level is determined by interpolation, the current level is between two adjacent designated levels, and the power voltage value corresponding to the current level is different from the power voltage value corresponding to the previous level directly adjacent to the current level, determine that the current level satisfies the first preset condition; and if the power voltage value corresponding to the level other than the designated level is not determined by interpolation, and the current level is a previous level directly adjacent to the designated level, determine that the current level satisfies the first preset condition, in which a display brightness value of the display screen at the previous level directly adjacent to the designated level is greater than a display brightness value of the display screen at the designated level.

In some optional embodiments, the initial data voltage value is determined by linear interpolation according to data voltage values corresponding to at least two designated levels.

Optionally, the designated levels include a first designated level and a second designated level, the current level is between the first designated level and the second designated level, and the initial data voltage value is determined by linear interpolation according to the data voltage values respectively corresponding to the first designated level and the second designated level.

In some optional embodiments, the first designated level and the second designated level are directly adjacent.

Optionally, the initial data voltage value is determined according to the following equation:

$$\frac{V_1 - V_2}{DBV_1 - DBV_2} = \frac{V_1 - V_0}{DBV_1 - DBV_0}$$

where $V_1$ is a data voltage value corresponding to the first designated level, $V_2$ is a data voltage value corresponding to the second designated level, $V_0$ is the initial data voltage value, $DBV_1$ is a register value corresponding to the first designated level, $DBV_2$ is a register value corresponding to the second designated level, and $DBV_0$ is a register value corresponding to the current level.

In some optional embodiments, the compensation data voltage value corresponding to at least one gray scale value at the current level is determined by: obtaining an initial data voltage value corresponding to the gray scale value at the current level; setting an initial compensation value corresponding to the gray scale value; driving, based on a data voltage value corresponding to the gray scale value at the current level and the initial compensation value, the display screen to display a test screen under the gray scale value and collecting a display brightness value of the display screen; if the collected display brightness value satisfies a second preset condition, directly determining the initial compensation value as the compensation data voltage value corresponding to the gray scale value at the current level; and if the collected display brightness value does not satisfy the second preset condition, adjusting the initial compensation value, until the display brightness value of the display screen satisfies the second preset condition based on the data voltage value corresponding to the gray scale value at the current level and the adjusted initial compensation value, and determining the adjusted initial compensation value as the compensation data voltage value corresponding to the gray scale value at the current level.

$$0 < \frac{L_{(n+1)} - L_n}{L_n} \leq 2\%,$$

Optionally, the second preset condition includes where $L_n$ is the collected display brightness value corresponding to the gray scale value at the current level, and $L_{(n+1)}$ is the display brightness value corresponding to the gray scale value at a previous level directly adjacent to the current level.

Optionally, the display screen includes sub-pixels of a plurality of colors, and setting the initial compensation value corresponding to the gray scale value includes: setting initial compensation values respectively corresponding to the sub-pixels of each color under the gray scale value.

Optionally, the test screen under the gray scale value includes a white screen under the gray scale value.

The apparatus for driving a display screen to display according to the embodiments of the present application may be a device, a component in a terminal, an integrated circuit, or a chip. The apparatus may be a mobile electronic device or a non-mobile electronic device. Exemplarily, the mobile electronic device may be a cellular phone, a tablet computer, a laptop computer, a palmtop computer, an in-vehicle electronic device, a wearable device, an Ultra-mobile Personal Computer (UMPC), a netbook, or a Personal Digital Assistant (PDA), etc., and the non-mobile electronic device may be a server, a Network Attached Storage (NAS), a Personal Computer (PC), a Television (TV), a teller machine, or a kiosk, etc., which are not specifically limited herein.

The apparatus for driving a display screen to display according to the embodiments of the present application can implement the various processes in the embodiments of the method for driving a display screen to display as shown in FIG. 1, which will not be repeated herein.

Figure 8:
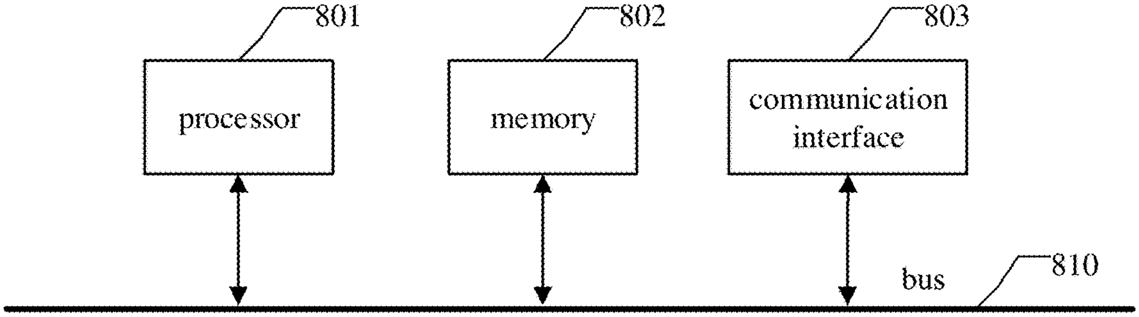
FIG. 8 shows a schematic structural diagram of a terminal device according to an embodiment of the present application.

FIG. 8 shows a schematic structural diagram of hardware of a terminal device according to the embodiments of the present application.

The terminal device may include a processor 801 and a memory 802 storing computer program instructions.

Specifically, the above processor 801 may include a central processing unit (CPU), or an Application Specific Integrated Circuit (ASIC), or one or more integrated circuits that may be configured to implement the embodiments of the present application.

The memory 802 may include a mass memory for data or instructions. By way of example and not limitation, the memory 802 may include a Hard Disk Drive (HDD), a floppy disk drive, a flash memory, an optical disk, a magnetic disk, a magnetic tape, or a Universal Serial Bus (USB) drive, or a combination thereof. Where appropriate, the memory 802 may include a removable or non-removable (or fixed) medium. Where appropriate, the memory 802 may be internal or external to an integrated gateway disaster recovery device. In particular embodiments, the memory 802 is a non-volatile solid state memory. In particular embodiments, the memory 802 includes a read-only memory (ROM). Where appropriate, the ROM may be a mask programmed ROM, a programmable ROM (PROM), an erasable PROM (EPROM), an electrically erasable PROM (EEPROM), an electrically alterable ROM (EAROM), or a flash memory, or a combination thereof. Exemplarily, the memory may include a non-volatile transient memory.

The processor 801 reads and executes the computer program instructions stored in the memory 802 to implement the method for driving a display screen to display in any one of the above embodiments.

In an example, the terminal device may further include a communication interface 803 and a bus 810. Herein, as shown in FIG. 8, the processor 801, the memory 802, and the communication interface 803 are connected and communicate with each other via the bus 810.

The communication interface 803 is mainly configured to achieve the communication among the various modules, apparatuses, units, and/or devices in the embodiments of the present application.

The bus 810 includes hardware, software, or both, to couple the components of the terminal device with each other. By way of example and not limitation, the bus may include an Accelerated Graphics Port (AGP) or other graphics buses, an Enhanced Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable buses, or a combination thereof. Where appropriate, the bus 810 may include one or more buses. Although specific buses are described and illustrated in the embodiments of the present application, the present application contemplates any suitable bus or interconnect.

The terminal device may execute the method for driving a display screen to display according to the embodiments of the present application, so as to implement the method for driving a display screen to display and the apparatus for driving a display screen to display described in conjunction with FIGS. 1 and 6.

The embodiments of the present application further provide a computer-readable storage medium storing a computer program thereon, in which the computer program may implement, when executed by a processor, the method for driving a display screen to display in the above embodiments and can achieve the same technical effect, which is not repeated herein. Herein, the above computer-readable storage medium may include a Read-Only Memory (ROM), a Random Access Memory (RAM), a magnetic disk, or a compact disc, which is not limited herein.

The functional block as shown in the structure diagram described above may be embodied as hardware, software, firmware or a combination thereof. When embodied as hardware, the functional block may be, for example, an electronic circuit, an Application Specific Integrated Circuit (ASIC), an appropriate firmware, plug-in, function card, and the like. When embodied as software, the element of the present application is a program or code segment that is configured to perform a desired task. The program or code segment may be stored in a machine-readable medium, or transmitted over a transmission medium or a communication link by means of a data signal carried in a carrier. The "computer-readable storage medium" may include any medium capable of storing or transmitting information. Example of the computer-readable storage medium include an electronic circuit, a semiconductor memory device, a ROM, a flash memory, an erasable ROM (EROM), a floppy disk, a CD-ROM, an optical disk, a hard disk, a fiber-optic medium, an RF link, and the like. The code segment may be downloaded via a computer network such as the Internet, Intranet.

According to the embodiments of the present application, the computer-readable storage medium may be a non-transitory computer-readable storage medium.

It should also be noted that the exemplary embodiments in the present application describe some methods or systems based on a series of steps or apparatuses. However, the present application is not limited to the above order of the steps, i.e., the steps may be performed in the order described in the embodiments or in a different order than the order in the embodiments, or several steps may be performed simultaneously.

Aspects of the present application are described above with reference to the flowchart and/or block diagram of the method, apparatus (system), and computer program product according to the embodiments of the present application. It should be understood that each block in the flowchart and/or block diagram and a combination of the blocks in the flowchart and/or block diagram may be implemented by computer program instructions. These computer program instructions may be provided to a processor of a general-purpose computer, a specialized computer, or other programmable data processing device to produce a machine, so that these instructions, executed by the processor of the computers or other programmable data processing device, enable the implementation of the function/action specified in one or more blocks of the flowchart and/or block diagram. Such a processor may be, but is not limited to, a general purpose processor, a specialized processor, a special application processor, or a field programmable logic circuit. It should also be understood that each block in the block diagram and/or flowchart and a combination of the blocks in the block diagram and/or flowchart may also be implemented by specialized hardware that performs specified function or action, or by a combination of specialized hardware and computer instructions.

The above embodiments of the present application do not exhaustively describe all the details, nor do they limit the present application to the specific embodiments as described. Obviously, according to the above description, many modifications and changes can be made. These embodiments are selected and particularly described in the specification to better explain the principles and practical applications of the present application, so that a person skilled in the art is able to utilize the present application and make modifications based on the present application. The present application is limited only by the claims and the full scope and equivalents of the claims.

What is claimed is:

1. A method for driving a display screen to display, comprising:

obtaining a current level of brightness adjustment of the display screen;

obtaining, under a condition that the current level satisfies a first preset condition, an initial data voltage value and a compensation data voltage value corresponding to the current level, wherein the first preset condition comprises that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different; and driving the display screen to display based on the initial data voltage value and the compensation data voltage value.

2. The method of claim 1, wherein at the current level, compensation data voltage values corresponding to different gray scale values are the same.

3. The method of claim 2, wherein the compensation data voltage value corresponding to any one of the gray scale values at the current level is the same as the compensation data voltage value corresponding to a maximum gray scale value of the display screen at the current level.

4. The method of claim 1, wherein the display screen includes a plurality of gray scale intervals, and at the current level, compensation data voltage values corresponding to different gray scale values within a same gray scale interval are the same.

5. The method of claim 4, wherein the compensation data voltage value corresponding to any one of the gray scale intervals at the current level is the same as the compensation data voltage value corresponding to a maximum gray scale value within the gray scale interval at the current level.

6. The method of claim 1, further comprising:

determining whether the power voltage value corresponding to the level other than the designated level is determined by interpolation;

if the power voltage value corresponding to the level other than the designated level is determined by interpolation, the current level is between two adjacent designated levels, and the power voltage value corresponding to the current level is different from the power voltage value corresponding to the previous level directly adjacent to the current level, determining that the current level satisfies the first preset condition; and if the power voltage value corresponding to the level other than the designated level is not determined by interpolation, and the current level is a previous level directly adjacent to the designated level, determining that the current level satisfies the first preset condition, wherein a display brightness value of the display screen at the previous level directly adjacent to the designated level is greater than a display brightness value of the display screen at the designated level.

7. The method of claim 1, wherein the initial data voltage value is determined by linear interpolation according to data voltage values corresponding to at least two designated levels.

8. The method of claim 7, wherein the designated levels comprise a first designated level and a second designated level, the current level is between the first designated level and the second designated level, and the initial data voltage value is determined by linear interpolation according to data voltage values respectively corresponding to the first designated level and the second designated level.

9. The method of claim 8, wherein the first designated level and the second designated level are directly adjacent.

10. The method of claim 9, wherein the initial data voltage value is determined according to the following equation:

$$\frac{V_1 - V_2}{DBV_1 - DBV_2} = \frac{V_1 - V_0}{DBV_1 - DBV_0}$$

where $V_1$ is a data voltage value corresponding to the first designated level, $V_2$ is a data voltage value corresponding to the second designated level, $V_0$ is the initial data voltage value, $DBV_1$ is a register value corresponding to the first designated level, $DBV_2$ is a register value corresponding to the second designated level, and $DBV_0$ is a register value corresponding to the current level.

11. The method of claim 1, wherein the compensation data voltage value corresponding to at least one gray scale value at the current level is determined by:

obtaining an initial data voltage value corresponding to the gray scale value at the current level;

setting an initial compensation value corresponding to the gray scale value;

driving, based on a data voltage value corresponding to the gray scale value at the current level and the initial compensation value, the display screen to display a test screen under the gray scale value and collecting a display brightness value of the display screen;

if the collected display brightness value satisfies a second preset condition, directly determining the initial compensation value as the compensation data voltage value corresponding to the gray scale value at the current level; and if the collected display brightness value does not satisfy the second preset condition, adjusting the initial compensation value, until the display brightness value of the display screen satisfies the second preset condition based on the data voltage value corresponding to the gray scale value at the current level and the adjusted initial compensation value, and determining the adjusted initial compensation value as the compensation data voltage value corresponding to the gray scale value at the current level.

12. The method of claim 11, wherein the second preset condition comprises:

$$0 < \frac{L_{(n+1)} - L_n}{L_n} \leq 2\%,$$

where $L_n$ is the collected display brightness value corresponding to the gray scale value at the current level, and $L_{(n+1)}$ is the display brightness value corresponding to the gray scale value at a previous level directly adjacent to the current level.

13. The method of claim 11, wherein the display screen comprises sub-pixels of a plurality of colors, and setting the initial compensation value corresponding to the gray scale value comprises:

setting initial compensation values respectively corresponding to the sub-pixels of each color under the gray scale value.

14. The method of claim 11, wherein the test screen under the gray scale value comprises a white screen under the gray scale value.

15. The method of claim 1, further comprising:

driving, under a condition that the current level does not satisfy the first preset condition, the display screen to display based on the initial data voltage value corresponding to the current level.

16. The method of claim 1, wherein the power voltage value corresponding to the level other than the designated level is determined by interpolation according to the power voltage value corresponding to the designated level.

17. The method of claim 1, wherein there are a plurality of levels between every adjacent two designated levels.

18. The method of claim 11, wherein the initial compensation value is set based on experience.

19. An apparatus for driving a display screen to display, comprising:

a first data obtaining module configured to obtain a current level of brightness adjustment of the display screen;

a second data obtaining module configured to obtain, under a condition that the current level satisfies a first preset condition, an initial data voltage value and a compensation data voltage value corresponding to the current level, wherein the first preset condition comprises that a power voltage value corresponding to the current level is different from a power voltage value corresponding to a previous level or a next level directly adjacent to the current level, the current level is a level other than a designated level, a power voltage value corresponding to the level other than the designated level is determined according to a power voltage value corresponding to the designated level, and power voltage values corresponding to different designated levels are different; and a display driving module configured to drive the display screen to display based on the initial data voltage value and the compensation data voltage value.

20. A terminal device, comprising:

a processor and a memory storing computer program instructions, wherein the processor implements, when executing the computer program instructions, the method for driving a display screen to display of claim 1.

* * * * *